United States Patent Office 3,385,859
Patented May 28, 1968

3,385,859
THIO-, SULFINYL-, AND SULFONYL-PYRIDYL PHOSPHOROTHIOATE DERIVATIVES
Raymond H. Rigterink, Midland, Mich., assignor to The Dow Chemical Company, Midland, Mich., a corporation of Delaware
No Drawing. Filed Apr. 25, 1966, Ser. No. 544,826
5 Claims. (Cl. 260—294.8)

The present invention is directed to a pyridyl phosphorus compound of the formula

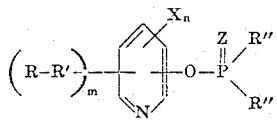

wherein R represents a member, the same in each occurrence, selected from the group consisting of loweralkyl and phenyl; R' represents a member, the same in each occurrence, selected from the group consisting of thio (—S—)

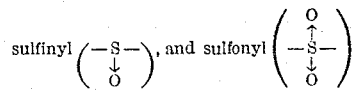

X represents halo; Z represents a member selected from the group consisting of oxygen and sulfur; each R'' independently represents a member selected from the group consisting of loweralkoxy, amino, and loweralkylamino; $m$ represents an integer of from 1 to 2, both inclusive; and $n$ represents an integer of from 0 to 3, both inclusive, the sum of $m$ and $n$ being an integer of from 1 to 4, both inclusive.

In the present specification and claims, the terms "loweralkyl" and "loweralkoxy" are employed to designate alkyl and alkoxy, respectively, radicals being of from 1 to 4, both inclusive, carbon atoms; the term "halo" is employed to designate appearances of bromine and chlorine only; and the term "loweralkylamino" is inclusive of both monoloweralkylamino and diloweralkylamino.

The products of the present invention are crystalline solids or viscous materials which are somewhat soluble in many common organic solvents and of very low solubility in water. The compounds are useful as parasiticides and are especially adapted to be employed as active toxicants in compositions for the control, and, in particular, for the selective control, of a number of arachnid, insect, helminth, bacterial and fungal organisms and aquatic animals; such as cockroaches, beetles, mites, ticks, worms, Southern armyworms, aphids, flies, mosquitoes, cattle grubs, screw worms, trash fish, snails, ascarids, nematodes, roundworms and plum curculio.

The products of the present invention are prepared by reacting a phosphorochloridate or phosphorochloridothioate having the formula

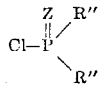

with an alkali metal salt of a pyridinol, having the formula

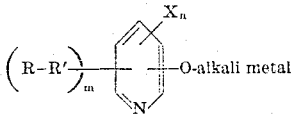

(the term "alkali metal" is employed herein to designate sodium and potassium only). The reaction conveniently is carried out in an inert organic liquid such as acetone, dimethylformamide, carbon tetrachloride, chloroform, benzene, toluene, isobutyl methyl ketone, or methylene dichloride. The amounts of the reactants to be employed are not critical, some of the desired product being obtained when employing the reactants in any amounts. In the preferred method of operation, good results are obtained when employing substantially equimolecular proportions of the pyridinol salt and phosphorochloridate or phosphorochloridothioate. The reaction takes place smoothly at a reaction temperature of from 0° to 100° C., and preferably at a reaction temperature of from 20° to 65° C., with the production of the desired product and of alkali metal chloride byproduct. In carrying out the reaction, the reactants are mixed and contacted together in any convenient fashion, and the resulting mixture maintained for a period of time in the reaction temperature range to complete the reaction. Following the completion of the reaction, the reaction mixture is washed with water and any organic reaction medium removed by fractional distillation under reduced pressure to obtain the desired product as a residue. This product residue can be further purified by conventional procedures such as washing with water and dilute aqueous alkali metal hydroxide, solvent extraction and recrystallization.

In an alternative procedure, the products of the present invention can be prepared by reacting phosphorus oxychloride or phosphorus thiochloride with an alkali metal pyridinol salt as previously defined to form an intermediate pyridyl phosphorodichloridate or phosphorodichloridothioate. Good results are obtained when employing substantilaly equimolecular proportions of the reactants. The reaction takes place readily at temperatures of from —50° to 80° C. with the production of the desired product and halide of reaction. The intermediate is thereafter reacted with one or two reactants appropriate to the introduction of the desired R'' moieties. Thus, when one or both R'' moieties are loweralkoxy, the intermediate is reacted with a compound of the formula

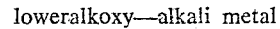
loweralkoxy—alkali metal

When one or both R'' moieties are amino or loweralkylamino, the intermediate is reacted with an amine compound of the formula

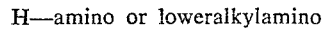
H—amino or loweralkylamino preferably in the presence of a hydrogen chloride acceptor, which can be an excess portion of the same amine compound. When one R'' moiety is loweralkoxy and the other amino or loweralkylamino, it is preferred that the loweralkoxy group be introduced prior to introduction of the amino or loweralkylamino group. The reaction takes place at temperatures at which chloride of reaction is formed. This chloride appears in the reaction mixture as alkali metal chloride, when a loweralkoxy-alkali metal reactant is employed, or as the hydrochloride salt of the hydrogen chloride acceptor employed when an amine compound reactant is employed. Good results are obtained when operating at temperatures of from —10° to 60° C., and employing substantially stoichiometric amounts of the reactants, or of the reactants and hydrogen chloride acceptor in the instance of an amine compound reactant. Upon completion of the reaction, the desired product is separated by conventional procedures as previously described.

The desirable properties of the present products are inherent in the pure compounds; and when highly selective properties are to be relied upon, the purified compounds will be preferred. However, for many applications, wherein low cost is a major consideration, the reaction mixture wherein the product was prepared can be used with no steps whatsoever of separating or purifying product compounds therefrom, since byproducts of reaction are often unobjectionable. Likewise, incompletely purified products can be used, when desired.

A preferred embodiment according to the present invention constitutes those subject compounds wherein the pyridyl moiety is a radical of the following formula:

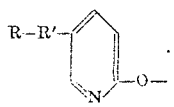

wherein R and R' are as previously defined.

The following examples illustrate the best mode now known by the inventor for practicing the present invention and will enable those skilled in the art to practice the same.

EXAMPLE 1.—O-(5-(ETHYLTHIO)-2-PYRIDYL) O,O-DIETHYL PHOSPHOROTHIOATE 5-(ethylthio)-2-pyridinol (12.0 grams; 0.08 mole), anhydrous sodium carbonate (8.2 grams; 0.08 mole), 200 milliliters of dimethylformamide, and O,O-diethyl phosphorochloridothioate (14.4 grams; 0.08 mole) were mixed together. The resulting mixture was heated to a temperature of about 60° C. and maintained at a temperature of 60°–65° C. for 1 hour with stirring to complete the reaction. The reaction mixture was then filtered and the reaction medium removed from the filtrate by distillation under reduced pressure to obtain the O-(5-(ethylthio)-2-pyridyl) O,O-diethyl phosphorothioate product as a residue. The product residue was dispersed in 200 milliliters of benzene and the resulting solution washed with three 35-milliliter portions of water. Solvent was removed by evaporation under subatmospheric pressure to separate the product. The product was further purified by mixing it with 25 milliliters of petroleum ether boiling at 60–70° C., filtering the resulting mixture, and removing the petroleum ether by evaporation under subatmospheric pressure. The purified product was found to be a liquid material having a refractive index $n_D^{25}$ of 1.5486.

EXAMPLE 2.—O-(3,5-BIS(ETHYLTHIO)-4-PYRIDYL) O,O-DIETHYL PHOSPHOROTHIOATE

In procedures essentially identical with those employed in Example 1, O-(3,5-bis(ethylthio)-4-pyridyl) O,O-diethyl phosphorothioate was prepared from 3,5-bis(ethylthio)-4-pyridinol and O,O-diethyl phosphorochloridothioate. The product was found to be a liquid material having a refractive index $n_D^{25}$ of 1.4422.

EXAMPLE 3.—O-(5-(METHYLSULFONYL)-2-PYRIDYL) O,O-DIETHYL PHOSPHOROTHIOATE 5-(methylsulfonyl)-2-pyridinol (8.4 grams; 0.049 mole) and sodium carbonate (5.2 grams; 0.049 mole) were mixed together with stirring in 50 milliliters of dimethylformamide. Thereafter, O,O-diethyl phosphorochloridothioate (9.2 grams; 0.049 mole) was added all at once with stirring. The addition was carried out at room temperature. Thereafter, stirring was continued for five hours, at which time the reaction mixture was cooled on an ice bath. To the cooled mixture, 100 milliliters of benzene and 100 milliliters of water were added with stirring. The reaction mixture was then permitted to separate into aqueous and organic portions and the aqueous portion discarded. The organic portion, containing the desired O-(5-(methylsulfonyl)-2-pyridyl) O,O-diethyl phosphorothioate product, was washed with 3 fifty-milliliter portions of water and benzene removed from the washed mixture by evaporation under subatmospheric pressure to obtain the product as a residue. The product after recrystallization from 15 milliliters of methanol, was found to be a white crystalline solid melting at 56.5–58° C.

EXAMPLE 4. — O - (3 - (ETHYLSULFINYL) - 5-CHLORO - 2 - PYRIDYL) O,O - DIETHYL PHOSPHOROTHIOATE

In procedures essentially identical with those employed in Example 3, O-3-(ethylsulfinyl)-5-chloro-2-pyridyl) O,O-diethyl phosphorothioate was prepared from 3-(ethylsulfinyl)-5-chloro-2-pyridinol and O,O-diethyl phosphorochloridothioate. The product was found to be a crystalline solid melting at 47–48.5° C.

In similar manners, other compounds representative of the present invention are prepared as follows:

From O,O-diethyl phosphorochloridothioate and the sodium salt of 6-(ethylthio)-2-pyridinol, O-(6-(ethylthio)-2-pyridyl) O,O-diethyl phosphorothioate, a liquid having a refractive index $n_D^{25}$ of 1.5232.

From O,O-dimethyl phosphorochloridate and the sodium salt of 6-(n-butylthio)-2-pyridinol, O-(6-(n-butylthio)-2-pyridyl) O,O-dimethyl phosphate, having a molecular weight of 291.3.

From O,O-diethyl phosphorochloridothioate and the sodium salt of 5-(methylsulfinyl)-2-pyridinol, O-(5-(methylsulfinyl)-2-pyridyl) O,O-diethyl phosphorothioate, a liquid having a refractive index $n_D^{25}$ of 1.5190.

From O-isopropyl dimethylphosphoramidochloridothioate and the potassium salt of 5-(isobutylsulfonyl)-2-pyridinol, O-(5-(isobutylsulfonyl)-2-pyridyl) O-isopropyl dimethylphosphoramidothioate, having a molecular weight of .364.5.

From O,O-diethyl phosphorochloridothioate and the sodium salt of 5-(phenylthio)-2-pyridinol, O-(5-(phenylthio)-2-pyridyl) O,O-diethyl phosphorothioate, a liquid having a refractive index $n_D^{25}$ of 1.5380.

From O-methyl n-butylphosphoramidochloridate and the sodium salt of 2,4-bis(n-propylsulfonyl)-3-pyridinol, O-(2,4-bis(n-propylsulfonyl)-3-pyridyl) O-methyl n-butylphosphoramidate product having a molecular weight of 457.

From O,O-diethyl phosphorochloridothioate and the sodium salt of 5-(isopropylthio)-2-pyridinol, O-(5-(isopropylthio)-2-pyridyl) O,O-diethyl phosphorothioate, a liquid having a refractive index $n_D^{25}$ of 1.5258.

From O,O-diethyl phosphorochloridothioate and the sodium salt of 4-(methylthio)-3,5,6-trichloro-2-pyridinol, O-(4-(methylthio-3,5,6-trichloro-2-pyridyl) O,O - diethyl phosphorothioate product having a molecular weight of 396.7.

From O,O-diethyl phosphorochloridothioate and the sodium salt of 6-(ethylsulfonyl)-2-pyridinol, O-(6-(ethylsulfonyl)-2-pyridyl) O,O-diethyl phosphorothioate, a liquid having a refractive index $n_D^{25}$ of 1.5332.

From tetramethylphosphorodiamidochloridate and the potassium salt of 3-(ethylsulfonyl)-5-bromo-2-pyridinol, O-(3-(ethylsulfonyl)-5-bromo-2-pyridyl) tetramethylphosphorodiamidate product having a molecular weight of 384.3.

From O,O,-diethyl phosphorochloridothioate and the sodium salt of 5-(isopropylsulfinyl)-2-pyridinol, O-(5-(isopropylsulfinyl)-2-pyridyl) O,O-diethyl phosphorothioate, a liquid having a refractive index $n_D^{25}$ of 1.5250.

From O-sec-butyl diethylphosphoramidochloridothioate and the sodium salt of 5-(phenylsulfonyl)-2-pyridinol, O-(5-(phenylsulfonyl)-2-pyridyl) O-sec-butyl diethylphosphoramidothioate product having a molecular weight of 410.5.

From O,O-diethyl phosphorochloridothioate and the sodium salt of 5-(methylthio)-2-pyridinol, O-(5-(methylthio)-2-pyridyl) O,O-diethyl phosphorothioate, a liquid having a refractive index $n_D^{25}$ of 1.5022.

From O-n-propyl phosphoramidochloridate and the sodium salt of 4,6-bis(methylthio)-2-pyridinol, O-(4,6-bis(methylthio)-2-pyridyl) O-n-propyl phosphoramidate product having a molecular weight of 308.4.

From O,O-diethyl phosphorochloridothioate and the sodium salt of 6-(ethysulfonyl)-2-pyridinol,O-(6-(ethylsulfonyl)-2-pyridyl) O,O-diethyl phosphorothioate, a liquid having a refractive index $n_D^{25}$ of 1.5207.

From O,O-diethyl phosphorochloridothioate and the sodium salt of 3-(ethylthio)-5-chloro-2-pyridinol, O-(3-(ethylthio)-5-chloro-2-pyridyl) O,O-diethyl phosphorothioate, a liquid having a refractive index $n_D^{25}$ of 1.5144.

From O,O-diethyl phosphorochloridothioate and the sodium salt of 5-(isopropylsulfonyl)-2-pyridinol, O-(5-(isopropylsulfonyl)-2-pyridyl) O,O-diethyl phosphorothioate, a liquid having a refractive index $n_D^{25}$ of 1.5221.

The products of the present invention are useful as parasiticides and parasite repellants in a variety of household, industrial, and agricultural operations. In particular, the products are useful for the kill and control of arthropod pest organisms, such as crustaceans, including sow bugs and fiddler crabs; arachnids, including spiders, mites, and ticks; myriapods, including centipedes; and insects. The products are especially effective for the control of the many anthropod organisms found on the roots or aerial portions of growing plants, including aphids, mites, and chewing and sucking insects, such as Southern army worm (*Prodenia eridania*), California red scale (*Aonidiella aurantii*), Mexican bean beetle (*Epilachna varivestis*), two-spotted spider mite (*Tetranychus bimaculatus*), and bean aphid (*Aphis fabae*).

The products can also be included in inks, adhesives, soaps, polymeric materials, cutting oils or in oil or latex paints. In addition, the products can be distributed in textiles, cellulosic materials, or in grains, or can be employed in the impregnation of wood and lumber. Furthermore, they can be applied to seeds. In yet other procedures, the products can be vaporized or sprayed or distributed as aerosols into the air, or onto surfaces in contact with the air. In such various applications, the products manifest the useful properties hereinbefore described.

The methods of the present invention comprise contacting an arthropod with an inactivating amount of one of the products to be employed in accordance with the present invention. The contacting can be effected by applying one of the products directly into the insect. The contacting can also be effected by application of the product to the habitats of arthropods. Representative habitats include soil, air, water, food, vegetation, inert objects, stored matter such as grains, other animal organisms, and the like. The inactivation can be lethal, immediately, or with delay, or can be a sub-lethal one in which the inactivated arthropod is not able to carry out one or more of its normal life processes. This latter situation prevails when one of the systems of the arthropod, typically the nervous system, is seriously disturbed. A preferred embodiment of the present invention comprises the employment of the present method for the kill and control of insects and arachnids.

The inactivation of an arthropod by the application of an inactivating amount of one of the products of the present invention is critical to the method of the present invention. The pyridyl phosphorous compound can sometimes be employed in unmodified form; however, it is generally preferred that the compound be composited with one or more pesticidal adjuvant substances, and the resulting compositions are comprehended within the present invention. The composition can be a liquid or a dust; and the adjuvant employed can be any one or a plurality of materials including aromatic solvents, petroleum distillates, water, or other liquid carriers, propellant substances, surface-active dispersing agents, light absorbers, and finely divided carrier solids. In such compositions, the adjuvant cooperates with the pyridyl phosphorus compound so as to obtain a composition to facilitate the method of the present invention, and to obtain an improved result. The use of either a surface-active dispersing agent or a finely divided carrier solid and the use of both a surface-active dispersing agent and a finely divided carrier solid, simultaneously, constitute preferred embodiments of the method of the present invention. Another preferred embodiment of the present invention is a composition comprising one or more of the products of the present invention, an organic liquid as a solvent and carrier therefor, and a propellant material. Numerous other embodiments will become available to those skilled in the art in view of the teachings set forth hereinbelow.

The exact concentration of one or more of the products in a composition thereof with one or a plurality of adjuvants can vary; it is necessary only that one or more of the products be present in such amount as to make possible the application of an inactivating dosage. In many situations, a composition comprising .0000001 percent of one, or a total of more than one, of the products is effective for the administartion of an inactivating amount thereof to arthropod pest organisms. Compositions having a higher concentration of the active agent, such as a concentration of from .0000001 to 0.5 percent, can of course be employed. In other operations, compositions containing from 0.5 to 98 percent by weight of one product, or from 0.5 to 98 percent of a total of more than one product, are conveniently employed. Such compositions are adapted to be employed as treating compositions and applied to parasites and to their habitats, or to be employed as concentrates and subsequently diluted with additional adjuvant to produce ultimate treating compositions.

When combining the present toxicants with adhesives, detergents, cutting oils, paints, polymeric materials, textiles, paper, and other similar products, good results are obtained when the compounds are incorporated in such products in the amount of 0.005 to 0.1 percent by weight, and when heavier applications are needed in the amount of from 0.1 to 2.0 percent by weight. When one or more than one of the present toxicants is combined with wood, excellent results are obtained when the toxicant compound or compounds are incorporated by conventional treatment of the wood in the amount of from 0.00005 to 0.05 pounds per cubic foot of wood, depending on depth of penetration, exposure, and the like.

In the preparation of dust compositions, the pyridyl phosphorous compound can be compounded with any of the finely divided carrier solids such as pyrophyllite, diatomaceous earth, gypsum and the like. In such operations, the finely divided carrier is ground or mixed with one or more of the products, as active agent, or wetted with a solution of the active agent in a volatile organic solvent. Similarly, dust compositions containing the pyridyl phosphorous compound can be similarly compounded from various of the solid dispersing agents, such as fuller's earth, attapulgite and other clays. These dust compositions can be employed as treating compositions or can be employed as concentrates and subsequently diluted with additional solid dispersing agent or with pyrophyllite, diatomaceous earth, gypsum and the like to obtain the desired amount of active agent in a treating composition. Also, such dust compositions can be dispersed in water, with or without the aid of surfactant, to form spray mixtures.

Further, one of the pyridyl phosphorous products or a dust concentrate composition containing such product can be incorporated in intimate mixture with surface active dispersing agents such as ionic and nonionic emulsifying agents to form spray concentrates. Such concentrates are readily dispersible in liquid carriers to form sprays containing the toxicant in any desired amount. The choice of dispersing agent and amount thereof employed are determined by the ability of the agent to facilitate the dispersion of the concentrate in the liquid carrier to produce the desired spray composition.

In the preparation of liquid compositions, the pyridiyl phosphorus product can be compounded with a suitable water-immiscible organic liquid and surface active dispersing agent to produce an emulsifiable liquid concentrate which can be further diluted with water and oil to form spray mixtures in the form of oil-in-water emulsions. In such compositions, the carrier comprises an aqueous emulsion, that is, a mixture of water-immiscible solvent, emulsifying agent and water. Preferred dispersing agents to be employed in these compositions are oil-soluble and include the non-ionic emulsifiers such as the polyoxyethylene derivatives or sorbitan esters, complex ether alcohols and the like. However, oil-soluble ionic emulsifying agents such as mahogany soaps can also be used. Suitable organic liquids to be employed in the compositions include petroleum oils and distillates, toluene, liquid halohydrocarbons and synthetic organic oils.

When operating in accordance with the present invention, one or more of the pyridyl phosphorus products or a composition containing the same is applied to the pests to be controlled directly, or by means of application to a portion or portions of their habitat in any convenient manner, for example, by means of hand dusters or sprayers or by simply mixing with the food to be ingested by the organisms. Application to the foliage of plants is conveniently carried out with power dusters, boom sprayers and fog sprayers. In such foliar applications, the employed compositions should not contain any appreciable amounts of any phytotoxic diluents.

In large scale operations, dusts, or low-volume sprays can be applied from an airplane. The present invention also comprehends the employment of compositions comprising one of the pyridyl phosphorus products, an adjuvant, and one or more other biologically active materials, such as other insecticides, fungicides, miticides, bactericides, nematocides, and the like, or one or more synergistic materials.

The control of arthropod organisms by the contacting thereof with various of the new pyridyl phosphorus products is illustrated by the following examples.

EXAMPLE 5

Aqueous compositions, each containing one of the products of the present invention, are prepared as follows: 4 parts by weight of one of the products, 0.08 part of sorbitan trioleate (Span 85) and 0.02 part of a sorbitan monolaurate polyoxyethylene derivative (Tween 80) are dispersed in 40 milliliters of acetone to produce a concentrate composition in the form of a water-dispersible liquid. This concentrate composition is dispersed in water to provide aqueous compositions containing varying amounts of the product employed.

In this manner, aqueous compositions are separately prepared with

O-(5-(ethylthio)-2-pyridyl) O,O-diethyl phosphorothioate;
O-(3,5-bis(ethylthio)-4-pyridyl) O,O-diethyl phosphorothioate;
O-(5-(methylsulfonyl)-2-pyridyl) O,O-diethyl phosphorothioate;
O-(3-(ethylsulfinyl)-5-chloro-2-pyridyl) O,O-diethyl phosphorothioate;
O-(6-(n-butylthio)-2-pyridyl) O,O-dimethyl phosphate;
O-(5-(isobutylsulfinyl)-2-pyridyl) O-isopropyl dimethylphosphoramidothioate;
O-(4,6-bis(n-propylsulfonyl)-3-pyridyl) O-methyl n-butylphosphoramidate;
O-(4-(methylthio)-3,5,6-trichloro-2-pyridyl) O,O-diethyl phosphorothioate;
O-(3-(ethylsulfinyl)-5-bromo-2-pyridyl) tetramethylphosphorodiamidate;
O-(5-(phenylthio)-2-pyridyl) O-sec-butyl diethylphosphoramidothioate;
O-(4,6-bis(methylthio)-2-pyridyl) O-n-propyl phosphoramidate;
O-(6-(ethylthio)-2-pyridyl) O,O-diethyl phosphorothioate;
O-(5-(phenylthio)-2-pyridyl) O,O-diethyl phosphorothioate;
O-(5-(methylthio)-2-pyridyl) O,O-diethyl phosphorothioate;
O-(5-(isopropylthio)-2-pyridyl) O,O-diethyl phosphorothioate;
O-(3-(ethylthio)-5-chloro-2-pyridyl) O,O-diethyl phosphorothioate;
O-(5-(isopropylsulfonyl)-2-pyridyl) O,O-diethyl phosphorothioate;
O-(5-(methylsulfinyl)-2-pyridyl) O,O-diethyl phosphorothioate;
O-(5-(isopropylsulfinyl)-2-pyridyl) O,O-diethyl phosphorothioate;
O-(5-(ethylsulfinyl)-2-pyridyl) O,O-diethyl phosphorothioate; and
O-(5-(ethylsulfonyl)-2-pyridyl) O,O-diethyl phosphorothioate.

EXAMPLE 6

In further operations, aqueous compositions, each containing one of the present products, are prepared as follows.

A known quantity of one of the products is mixed with a quantity of water, a quantity of an alkyl aryl sulfonate (Nacconol NR), and a quantity of a substituted benzoid alkyl sulfonic acid (Daxad 27), and the resulting mixture ballmilled together to produce a composition containing 4000 parts by weight of the product employed, 300 parts by weight of Nacconol NR and 300 parts by weight of Daxad 27, per million parts of ultimate composition.

In this procedure, there are prepared aqueous compositions from each of the compounds identified in Example 5.

Compositions prepared according to these procedures of Example 6 can be employed as treating compositions or can be diluted with additional quantities of water to prepare aqueous treating compositions of lesser concentrations.

EXAMPLE 7

An aqueous treating composition containing 100 parts of O-(6-(ethylthio)-2-pyridyl) O,O-diethyl phosphorothioate per million parts by weight of ultimate aqueous treating composition was prepared according to the procedures of Example 5. This aqueous treating composition was employed for the control of Mexican bean beetles (*Epilachna varivestis*), in the third instar stage, on cranberry bean plants. The cranberry bean plants were wetted briefly with the aqueous treating composition, the wetted plants permitted to dry, and the dried plants placed within a confined area and caused to be infested with a known number of Mexican bean beetles. Thereafter, the infested plants were held under good agricultural conditions for a period of several days. At the end of this period, the cranberry bean plants were examined and it was found that there was obtained a complete kill of the Mexican bean beetles.

EXAMPLES 8–17

Other products of the present invention were evaluated for the control of Mexican bean beetles in accordance with the procedures of Example 7. These other products were the following: O-(5-(phenylthio)-2-pyridyl) O,O-diethyl phosphorothioate; O-(5-(methylthio) - 2 - pyridyl) O,O-diethyl phosphorothioate; O - (5-(isopropylthio)-2-pyridyl) O,O-diethyl phosphorothioate; O-(3-(ethylsulfinyl)-5-chloro-2-pyridyl) O,O-diethyl phosphorothioate; O-(5-(isopropylsulfonyl) - 2 - pyridyl) O,O-diethyl phosphorothioate; O-(5-(methylsulfinyl) - 2 - pyridyl) O,O-diethyl phosphorothioate; O-(5-(methylsulfonyl)-2-pyridyl) O,O-diethyl phosphorothioate; O-(5-(isopropylsulfinyl)-2-pyridyl) O,O - diethyl phosphorothioate; O-(6-(ethylsulfonyl)-2-pyridyl) O,O-diethyl phosphorothioate; and O-(3-(ethylthio) - 5 - chloro-2-pyridyl) O,O-diethyl phosphorothioate. In the instance of each product, a complete kill of Mexican bean beetles was obtained.

EXAMPLE 18

An aqueous treating composition containing 25 parts of O-(5-(phenylthio)-2-pyridyl) O,O - diethyl phosphorothioate per million parts by weight of ultimate aqueous treating composition was prepared according to the procedures of Example 5. A quantity of fruit and a known number of plum curculio adults feeding thereon were wetted briefly with this aqueous treating composition; thereafter, the treated fruit and curculio adults were permitted to dry and were held for about 6 days under conditions conducive to the growth and well being of plum curculio adults. At the end of the 6 day period, the fruit was examined to determine the percent mortality of plum curculio, and it is found that there had been obtained a 100 percent kill and control of plum curculio.

EXAMPLE 19

An aqueous treating composition containing 50 parts of O-(5-(methylthio)-2-pyridyl) O,O-diethyl phosphorothioate per million parts by weight of ultimate aqueous treating composition was prepared according to the procedures of Example 5. Houseflies (*Musca domestica*) were uniformly wetted briefly with this aqueous treating composition and thereafter observed for mortality for 72 hours. It was found that treatment of the houseflies in this manner with the subject compound resulted in a 100 percent kill of houseflies.

EXAMPLE 20

Essentially the same results reported in Example 19 were obtained when O - (5-(methylsulfinyl)-2-pyridyl) O,O-diethyl phosphorothioate was evaluated in the procedures of Example 19.

EXAMPLE 21

A composition was prepared according to the procedures of Example 5 and containing 12.5 parts of O-(5-(methylsulfonyl)-2-pyridyl) O,O - diethyl phosphorothioate as sole toxicant per million parts by weight of ultimate treating composition. Cranberry bean plants heavily infested with two-spotted spider mites in the egg and adult stages were wetted briefly with this treating composition, the treated plants permitted to dry, and the treated and dried plants held under favorable agricultural conditions for a period of about 5 days. At the end of the this period, the plants were examined to ascertain the percent kill and control of two-spotted spider mites in the adult stage, and to ascertain the percent kill and control of two-spotted spider mites in the egg stage. It was found that there was a 100 percent kill of the two-spotted spider mites in the adult stage, and an essentially complete kill and control of two-spotted spider mites in the egg stage.

EXAMPE 22

Essentially the same results reported in Example 21 were obtained when employing O-(5-(isopropylsulfinyl)-2-pyridyl) O,O-diethyl phosphorothioate as sole toxicant in the procedures of Example 21.

The O-loweralkyl phosphoramidochloridates and phosphoramidochloridothioates employed as starting materials in accordance with the teachings of the present application are prepared by reacting two molecular proportions of a suitable amine with one molecular proportion of an O-loweralkyl phosphorodichloridate or phosphorodichloridothioate at a temperature of from −10 to 50° C. Upon completion of the reaction, the desired product is separated by conventional methods.

The phosphorodiamidochloridates and phosphorodiamidochloridothioates to be employed as starting materials are prepared by reacting phosphorus oxychloride or phosphorus thiochloride with a suitable amine in the presence of a hydrogen chloride acceptor to introduce the desired amino or lower alkylamino groups into the molecule. Where it is desired to produce a starting material having different amino and/or loweralkylamino groups, the phosphorus oxychloride or thiochloride is reacted successively with different amines. Good results are obtained when employing stoichiometric amounts of the reactants and of hydrogen chloride acceptor, which can be an excess portion of the amine reactant, and when operating at temperatures at which chloride of reaction is formed.

The O,O-diloweralkyl phosphorochloridates and O,O-diloweralkyl phosphorochloridothioates, employed as starting materials as described herein, are prepared in known procedures by reacting phosphorus oxychloride or phosphorus thiochloride with an alkali metal alcoholate to introduce two alkoxy groups into the molecule. Where it is desired to produce the mixed diester, the phosphorus oxychloride or phosphorus thiochloride is reacted successively with different alcoholates. Good results are obtained when employing stoichiometric amounts of the reagents and operating at temperatures at which chloride of reaction is formed. Following the reaction, the desired products are separated by known procedures.

The alkali metal salts of the pyridinol, which salts are of the formula

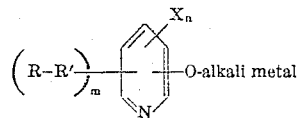

and which are useful to be employed as starting materials in the preparation of the products of the present invention, are prepared in known procedures from the corresponding pyridinol compounds. Thus, the corresponding pyridinol compound is reacted with a base, which can be an alkali metal hydroxide or carbonate. These reactions to prepare the salts are preferably carried out in an inert liquid reaction medium.

The said alkali metal salts are conveniently employed in situ; in such procedures, the desired salt, in the reaction medium in which prepared, is reacted with the phosphorochloridate or phosphorochloridothioate, or phosphorus oxychloride or phosphorus thiochloride, as hereinbefore taught. In other procedures, the products of the present invention are prepared by reacting together the pyridinol compound, the base, and the phosphorochloridate or phosphorochloridothioate, or phosphorus oxychloride or phosphorus thiochloride; in these procedures, the same reaction conditions taught hereinabove for the reaction of the said alkali metal salt are employed.

The corresponding pyridinol compounds, that is, the compounds of the formula

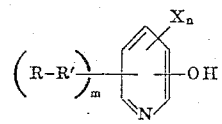

are prepared in various procedures. Those wherein R' represents thio are preferably prepared by the reaction of a halogenated pyridinol of the formula

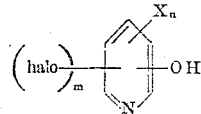

with a cuprous mercaptide reactant of the formula Cu—S—R in the presence of a basic solvent such as pyridine, lutidine, or quinoline. In the halogenated pyridinol, "halo" is prefebrably bromo, but can also be chloro, especialy where R represents phenyl, and/or where the halo group(s) being replaced are on the 2, 4, and/or 6 position(s). Good results are obtained when employing one molecular proportion of halogenated pyridinol and *m* proportions of cuprous mercaptide reactant. The cuprous mercaptide reactant is conveniently prepared in situ, such as by the reaction of a disulfide (R—S—S—R) and metallic copper. The reaction goes forward at temperatures of up to about 180° C., where R is loweralkyl, and up to about 250° C., where R is phenyl; higher temperatures are to be avoided because decomposition of the cuprous mercaptide reactant may take place.

The corresponding pyridinol compounds wherein R' represents sulfinyl or sulfonyl are prepared from the corresponding compounds wherein R' represents thio. In this preparation, the corresponding thio compound is reacted with hydrogen peroxide to oxidize the thio sulfur atom to either a sulfinyl of sulfonyl group. The sulfinyl group is obtained when employing equimolecular proportions of the corresponding thio compound and hydrogen peroxide; and the sulfonyl group is obtained when employing one molecular proportion of the corresponding thio compound and from two to about two and one-half molecular proportions of hydrogen peroxide. The reaction goes forward readily at temperatures of 20–110° C., preferably carried out in glacial acetic acid as a reaction medium.

I claim:

1. Compound of the formula

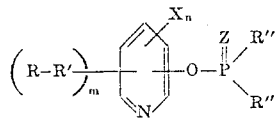

wherein R represents a member, the same in each occurrence, selected from the group consisting of loweralkyl and phenyl; R' represents a member, the same in each occurrence, selected from the group consisting of thio, sulfinyl, and sulfonyl; X represents halo; Z represents a member selected from the group consisting of oxygen and sulfur; each R" independently represents a member selected from the group consisting of loweralkoxy, amino, and loweralkylamino; $m$ represents an integer of from 1 to 2, both inclusive; and $n$ represents an integer of from 0 to 3, both inclusive, the sum of $m$ and $n$ being an integer of from 1 to 4, both inclusive.

2. The compound of claim 1 which is of the formula

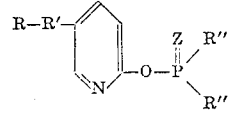

3. The compound of claim 2 which is O-(5-(isopropylthio)-2-pyridyl) O,O-diethyl phosphorothioate.
4. The compound of claim 2 which is O-(5-(methylthio)-2-pyridyl) O,O-diethyl phosphorothioate.
5. The compound of claim 2 which is O-(5-(phenylthio)-2-pyridyl) O,O-diethyl phosphorothioate.

References Cited

UNITED STATES PATENTS 3,335,146  8/1967  Reifschneider et al. __ 260—294.8

JOHN D. RANDOLPH, *Primary Examiner.*

A. ROTMAN, *Assistant Examiner.*